July 28, 1931.  H. H. DAWSON ET AL  1,816,280
FITTER OR SHAPER FOR GLASS ARTICLES
Filed April 8, 1926   3 Sheets-Sheet 2
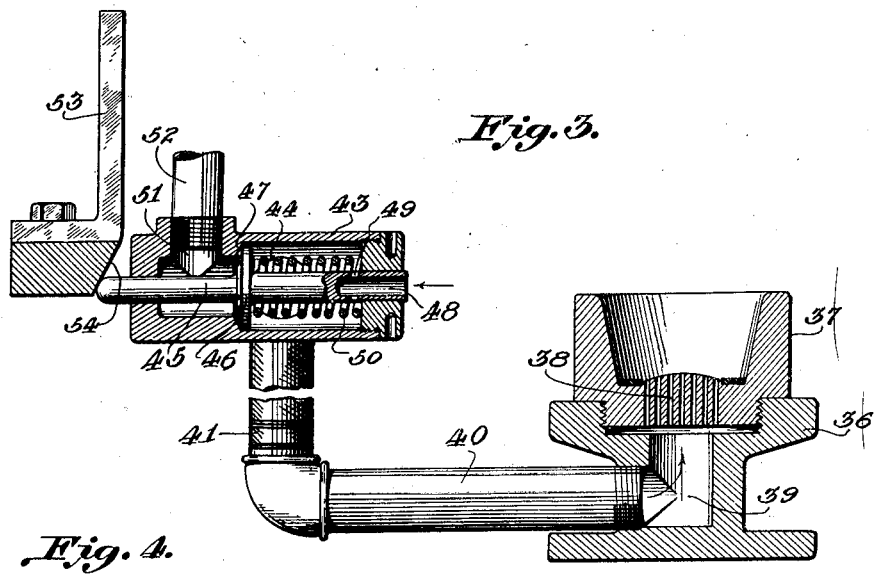
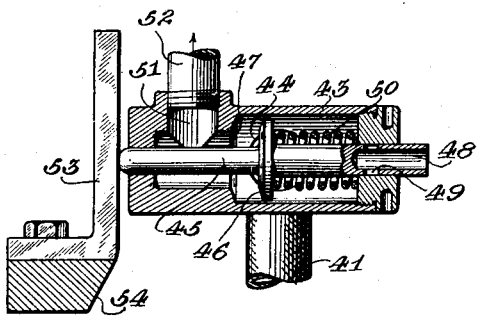
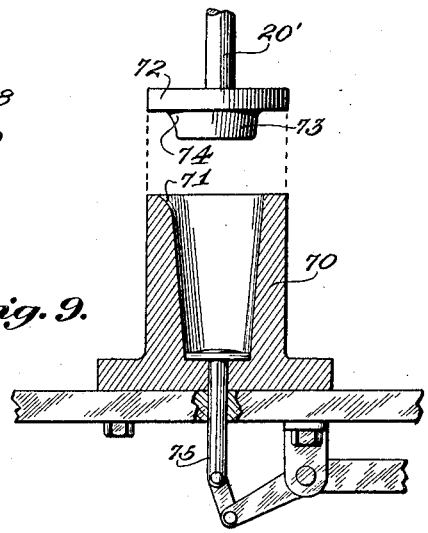
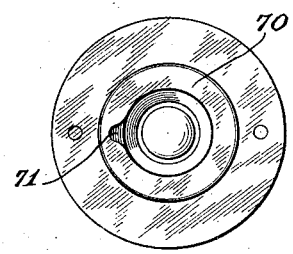
Inventors
Haller H. Dawson,
and Ira H. Freese.
By Eccleston & Eccleston
Attorneys

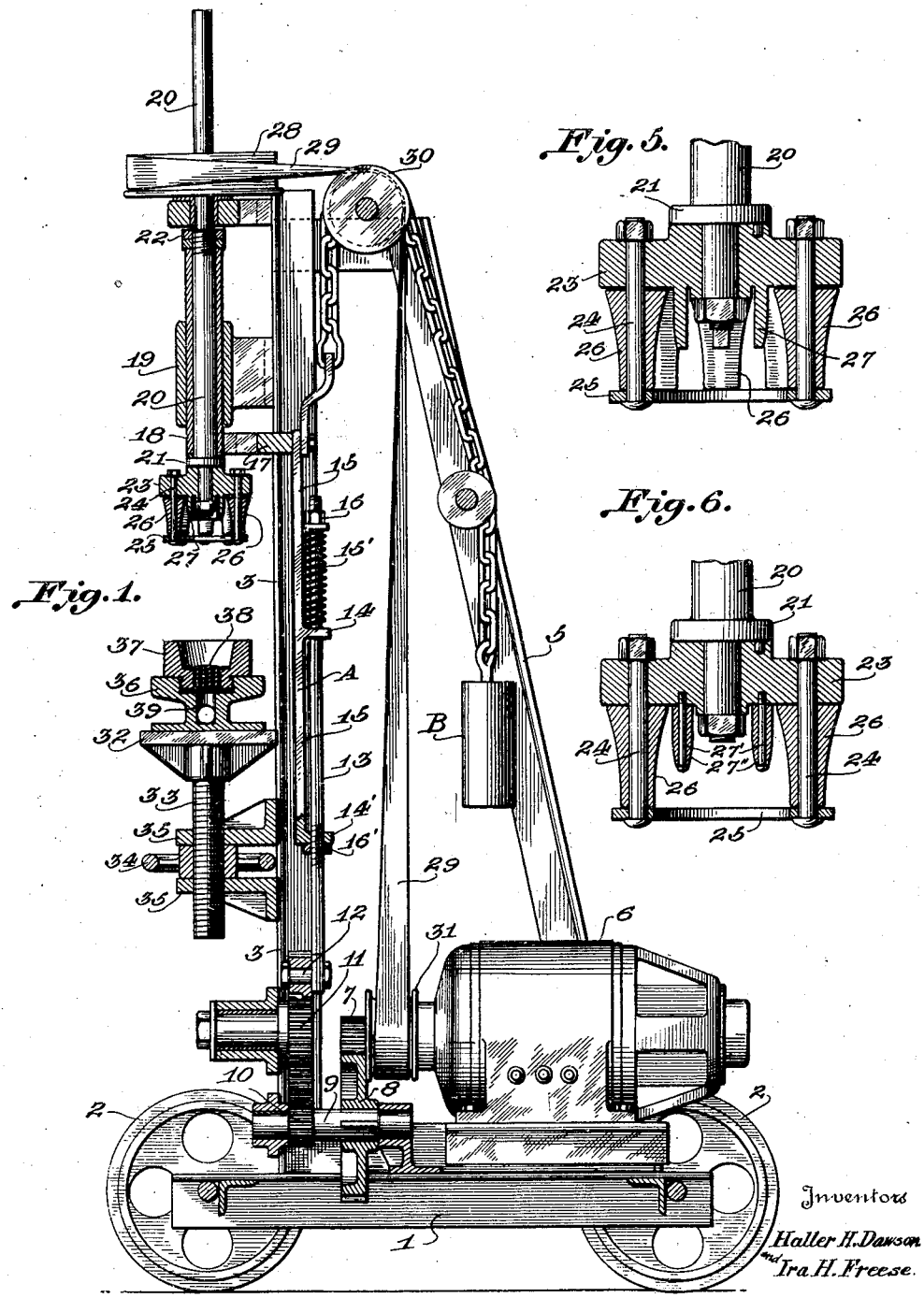

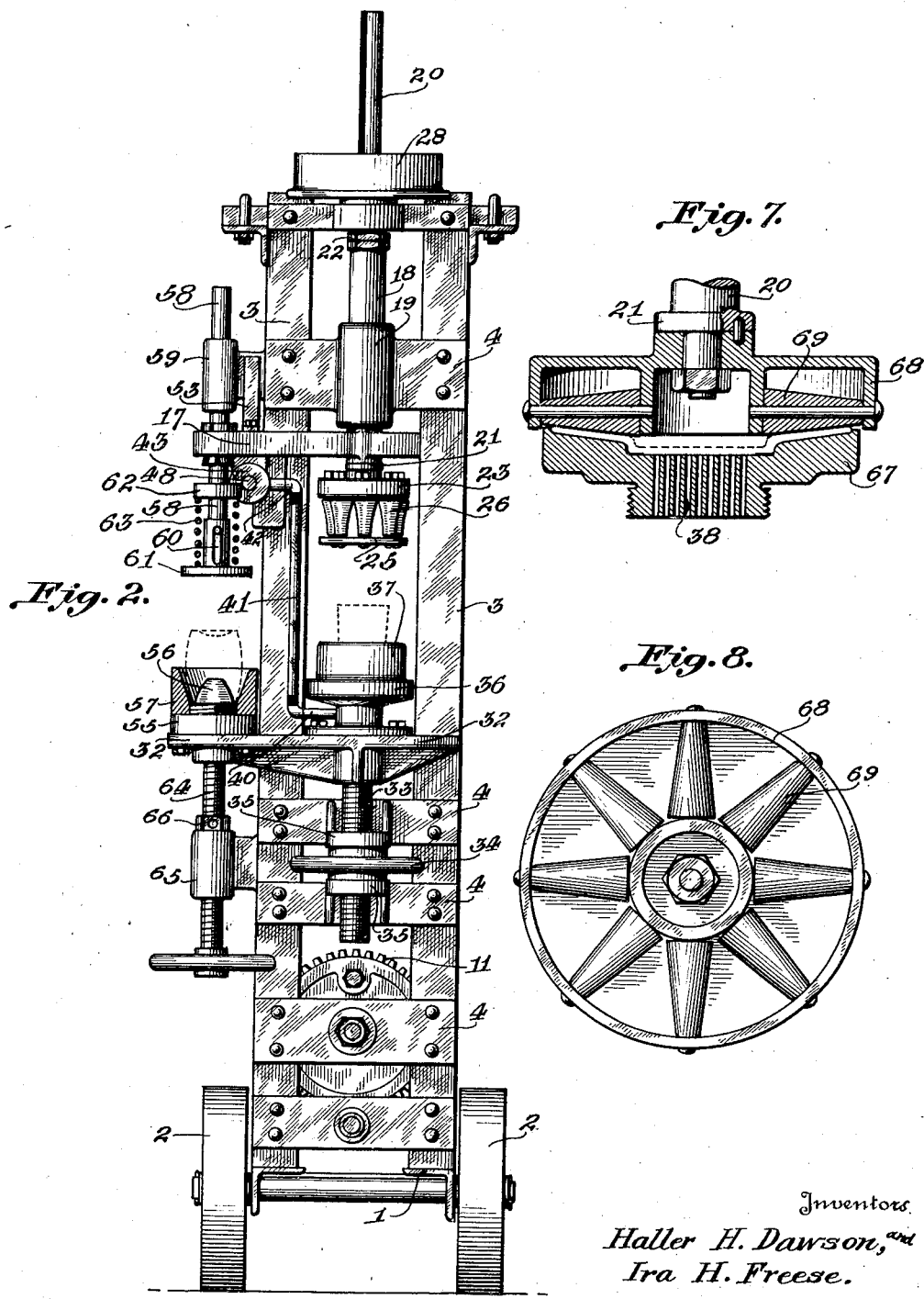

Patented July 28, 1931

1,816,280

UNITED STATES PATENT OFFICE

HALLER H. DAWSON AND IRA H. FREESE, OF CLARKSBURG, WEST VIRGINIA; LULA P. DAWSON EXECUTRIX OF SAID HALLER H. DAWSON, DECEASED, ASSIGNORS TO HAZEL-ATLAS GLASS CO., OF WHEELING, WEST VIRGINIA, A CORPORATION OF WEST VIRGINIA

FITTER OR SHAPER FOR GLASS ARTICLES

Application filed April 8, 1926. Serial No. 100,562.

The invention relates to machines which may be operated automatically, semi-automatically, or by hand, to shape various glass articles such as barrel tumblers, bell-mouth tumblers, lipped articles, plates, etc.

The object of the invention is to provide a machine of this character which is simple in construction and operation, and which will function in a highly efficient manner to accurately and rapidly shape and fit various types of glass articles.

The various advantages of the invention will be apparent to those skilled in the art, from the following detailed description when taken in connection with the accompanying drawings; in which Figure 1 is a side elevational view of the machine; parts being shown in section to more clearly disclose the construction.

Figure 2 is a front elevational view of the machine.

Figure 3 is a detail view showing in section the article holder and the valve means for controlling the vacuum.

Figure 4 is a detail sectional view of the valve means for controlling the vacuum, and showing the valve in a different position from that shown in Figure 3.

Figure 5 is an enlarged detail sectional view of the shaping head.

Figure 6 is an enlarged detail sectional view of a slightly modified form of the shaping head.

Figure 7 is a vertical sectional view of a slightly modified form of shaping head, particularly adapted for shaping plates or the like.

Figure 8 is a bottom plan view of the shaping head shown in Figure 7.

Figure 9 is a vertical sectional view of shaping mechanism, for shaping lipped articles, such as graduates, pitchers, or the like; and Figure 10 is a plan view of the shaping mechanism illustrated in Figure 9.

Referring to the drawings more in detail, numeral 1 indicates the carriage of the machine which is preferably mounted on wheels 2. The frame of the machine, which is mounted on the carriage 1, may be of any preferred construction, but in the particular embodiment illustrated herein, it consists of two vertical standards 3, 3, which are rigidly attached to he carriage, and which are strengthened by tie plates 4, and braces 5.

The mechanism may be driven, of course, from any desired source of power, but in this particular form a motor 6 is employed for driving the machine, and it is preferably mounted directly on the carriage 1. The motor drives a shaft carrying the small pinion 7, meshing with a larger gear 8 fixed to the shaft 9. Also fixed to the shaft 9 is a small pinion 10, meshing with a larger gear 11, which functions as a crank disk. The crank disk 11 is provided with a wrist pin 12 to which is pivotally attached the lower end of a pitman, indicated generally by reference character A. This pitman reciprocates the shaping head, and in order that the shaping head may be applied to the articles to be shaped with a gradual force, and also in order to prevent breakage of parts, it is desirable to provide some resilient connection in the pitman. In the specific form of pitman illustrated, a rod 13 is pivotally attached at its lower end to the wrist pin 12, and this rod is slidably mounted in bearings 14, 14', carried by the arm 15. The rod 13 extends above the bearing 14 and mounted on the rod is a spring 15', which is held in compression between the bearing 14 and the adjustable nut 16. Also mounted on the rod 13, and below the bearing 14', is an adjustable nut 16'. The upper end of the arm 15 is pivotally attached to a crosshead 17 which reciprocates the shaping head. The mechanism is appropriately counterbalanced by counterweight B. Thus when the rod 13 descends it will apply, through the spring 15' a gradually increasing pressure on the arm 15, which accordingly applies a gradually increasing pressure on the shaping head; and if for some reason the shaping head could not descend its normal distance, the spring would simply be compressed to a further extent and no parts would be broken.

The crosshead 17 carries a sleeve 18 which is mounted for vertical sliding movement in the bearing 19. A shaft 20 is mounted for rotation in the sleeve 18, but is held against vertical movement with respect thereto, by means of collar 21, and nuts 22.

Fixed to the lower end of the shaft 20 is the shaping head. The particular shaping head illustrated in Figures 1 and 5 consists of a plate 23 which is detachably fixed to the lower end of the shaft 20 by any desired means, and which carries a circular series of downwardly extending pins 24; the lower ends of the pins passing through holes in a ring 25, whereby the pins are retained in their proper position. Loosely mounted on each pin 24 is a roller 26, and in the particular form illustrated these rollers are gradually flared upwardly and outwardly. Extending downwardly from the under side of the plate 23 is an annular flange 27, which fits within the mouth of the tumbler or other article being shaped, to retain the upper edge thereof in its circular form. The modified form of shaping head shown in Figure 6 differs from the form shown in Figures 1 and 5, only in that the annular flange 27 is replaced by a circular series of pins 27', upon each of which is mounted a roller 27''. The upper portion of each roller is cylindrical, whereby these rollers will contact only with the upper edge of the articles being shaped, to retain them in true circular form.

The construction of the shaping head, and the means by which it is vertically reciprocated, have been described, and we shall now describe the means by which the head is rotated during its reciprocating movement.

The shaft 20 has splined thereon a pulley 28, whereby the rotary movement of the pulley will be imparted to the shaft 20, but permitting the shaft to reciprocate vertically through the pulley. The pulley 28 is continuously rotated by means of a pulley belt 29 which passes around the pulley 28, over a guide pulley 30, and around the driving pulley 31 fixed to the motor shaft, which also carries the previously described pinion 7.

In accordance with the mechanism thus far described, the shaper is periodically lowered into engagement with the article to be shaped, and is continuously rotated, to give the articles the desired shape; and we shall now describe the holder for the article, together with the means for periodically applying a vacuum to the bottom of the article.

Referring to Figures 1, 2 and 3, numeral 32 indicates a shelf which is carried on the upper end of a threaded rod 33. The rod is adjusted vertically by means of a handwheel 34 which is threaded on the rod between the brackets 35. Suitably attached to the shelf is a base member 36, and threadedly attached to the base member is the holder 37; the size and shape of the holder varying with the different articles to be treated. It is essential, of course, that the articles be held very firmly during the shaping operation, and for this purpose we have provided the bottom of the holder with a plurality of small passages 38 communicating with a passage 39 in the base member 36. A short pipe section 40 is attached to the base member and communicates with the passage 39, and connected with this pipe section is a flexible hose 41 which extends upwardly and is connected to a pipe section 42. This pipe section 42 is attached to and communicates with the interior of a valve cylinder 43; the opening of the pipe section into the valve cylinder being shown in Figures 3 and 4, and indicated by numeral 44.

The valve structure will now be described; reference being had particularly to Figures 3 and 4. Arranged within the valve cylinder 43 is a slidably mounted valve stem 45, carrying a valve 46, adapted to cooperate with the valve seat 47. The left hand portion (Figs. 3 and 4) of the valve stem projects through the end of the cylinder; and the opposite end of the valve stem is hollow, as indicated by numeral 48. This tubular portion of the valve stem is provided with ports, as indicated by numeral 49. When the valve stem is in the position shown in Figure 3, the interior of the cylinder communicate with the atmosphere by means of ports 49 and passage 48. However, when the valve is moved to the position shown in Figure 4, this communication is shut off, for the ports are within the cylinder head and hence are closed. A spring 50 surrounds the valve stem and normally forces the valve 46 against its seat 47. The portion of the cylinder to the left (Figs. 3 and 4) of the valve seat 47 is provided with a port 51 to which is attached a pipe 52 leading to any vacuum source. As stated hereinbefore, the left hand end of the valve stem 45 projects through and beyond the end of the cylinder, and this stem is moved to the right by means of a shoe 53 which is attached to the crosshead 17; the lower end of the shoe being beveled, as indicated by numeral 54. Thus, as the crosshead descends the shoe also descends, and when the beveled portion of the shoe contacts with the outwardly projecting portion of the valve stem, the latter will be forced inward, and will be held in this position by the vertical portion of the shoe, until the crosshead is lifted to carry the shoe above the valve stem, thereby releasing the stem and permitting the spring together with the vacuum to move the valve stem to the left. The operation of this feature of the invention will now be described.

The article to be shaped is placed in the holder 37 and the crosshead starts to descend, carrying with it the rotary shaping head and the shoe 53. Just before the shaping head reaches the article, the beveled portion of the shoe will strike the valve stem and force it inwardly. When the valve stem moves inwardly it unseats the valve 46, and closes the ports 49 by moving the hollow stem to a position where the ports are within the cylinder head; the various elements being now in the positions indicated in Figure 4. With the elements in this position it is apparent that the vacuum from the pipe 52 will be applied directly through the cylinder and its connections to the passage 39 in the base member 36, and thence through the small ducts 38 to the article in the holder. In the above described manner, the vacuum is applied to the article just before the shaping implement reaches it, to thereby firmly hold the article during the shaping operation.

The shaping head continues its descent and the shaping rollers come into contact with the upper end of the article to be shaped. In the particular instance illustrated the article is an ordinary drinking glass, as shown in dotted lines at the right of Figure 2, and which is to be shaped to barrel form, as shown by dotted lines at the left of Figure 2. The article to be shaped has been heated, of course, to the necessary temperature, and as the descending and revolving rollers come into contact with the article, the wall thereof will be gradually and uniformly turned inwardly conforming to the contour of the rollers, and in this particular instance the article will be shaped into a barrel tumbler. Of course, the same apparatus, but with a different shaping head, may be employed for a great variety of different shaped tumblers, such as graduates, bell mouth tumblers, etc.; and it may also be employed for shaping a great variety of other articles such as plates, pitchers, etc.

Having shaped the article, the shaping head ascends, and just after it is free of the article the shoe 53 frees the valve stem 45, whereupon the spring 50, assisted by the vacuum, will cause the valve stem to move quickly to the left, seating the valve 46, and moving the ports 49 into the interior of the cylinder. The various parts are now in the position indicated in Figure 3. The valve 46 having seated, cuts off the vacuum which has been applied to the holder; and the ports 49 being now within the cylinder, communication is opened from the atmosphere through passage 48 and ports 49 to the interior of the cylinder, and thence through the pipe connection to the holder thereby instantly breaking the vacuum, and permitting the shaped article to be removed.

In the above described shaping operation the flange 27, or the inner rollers 27'', keep the mouth of the tumbler in substantially circular form, but in order that the mouth may be perfectly circular the article is further fitted by a device now to be described.

Numeral 55 indicates a base member which is preferably mounted on the shelf 32 which also supports the previously described holder 37. Arranged centrally of and projecting upwardly from the base member 55 is a round knob 56, and threaded on the base member is a holder 57; the knob and the holder cooperating to form an annular groove, into which the mouth of the article is fitted. The crosshead 17 has fixed thereto, in vertical alignment with the knob 56, a plunger rod 58; the upper portion of the rod being guided in a sleeve 59 fixed to the frame 3. Slidably mounted on the lower end of the plunger rod 58, by means of a pin and slot connection 60, is a plunger cap 61. Arranged on the rod 58 is a collar 62, and mounted on the rod, between the collar 62 and the plunger cap 61, is a coil spring 63, which normally holds the cap in its lowermost position with respect to the rod. The operation of this feature of the invention will now be described.

As soon as an article has been shaped, in the manner hereinbefore described, the operator removes the article from the holder, and inverts it; placing it mouth down over the knob 56; and at the same time he places another article in the holder 37. The crosshead 17 descends, carrying with it the shaper head 23 and the plunger 58. The shaper will shape the article in the holder 37 in the manner hereinbefore described; and the plunger cap will press against the upwardly presented bottom of the inverted article in the holder 57. The pressure exerted by the cap will cause the mouth of the article to conform to the curvature of the knob 56, thereby insuring a perfectly circular mouth. The spring 63 holds the plunger cap against the bottom of the article, while the pin and slot connection permits the plunger rod 58 to continue its descent with the crosshead 17, which is, of course, descending further to shape the article in the holder 37. The crosshead now ascends, carrying with it the shaper head and the plunger, and the operator removes the finished article from the holder 57, removes the shaped article from the holder 37, inverts it and places it in holder 57, and places another article in the holder 37; by which time the crosshead again descends, and the two devices repeat the operations just described. For the purpose of rigidly supporting that portion of the shelf carrying the base member 55, we provide a rod 64 which is attached to the underside of the table and extends loosely through a bracket 65. The rod is threaded and has mounted thereon a nut 66, which may be screwed down against the top of the bracket 65, so that the pressure applied by the plunger cap 61 will be transmitted directly to the bracket 65.

The modified form of the shaper, as illustrated in Figures 7 and 8, involves exactly the principle as the shaper heads shown in Figures 5 and 6; the structure having been changed slightly to adapt the shaper for operation on a different class of articles. Numeral 67 indicates the holder, which is screw-threaded into the base member 36, as previously described; the holder being provided with the small ducts 38, as in the previously described forms. Numeral 68 indicates the shaper head; which will be carried by the rotating and reciprocating rod 20, and a plurality of conical shaped rollers 69 extend radially from the center of the head; the rollers being loosely mounted so that they will be rotated by frictional engagement with the article being shaped.

The upper surface of the holder 67, has in the particular form illustrated, the shape of a plate. The article to be treated may be a nappie or the like, and it will be placed in the holder 67, where it will be held firmly during the shaping operation, by means of the vacuum applied through the ducts 38, in the manner previously described. The shaper head will descend and at the same time will be rotated, so that the rollers 69 coming into contact with the nappie or the like will flatten it out to conform to the shape of the holder, which, in the particular form illustrated, is a plate. It is thus apparent that articles which are difficult to make in presses, may be pressed in the form of articles which are easily made in presses, and then be shaped, in the manner described, to the form of articles which are difficult to make in presses.

The modified form illustrated in Figures 9 and 10, relates particularly to a device for forming lips on various articles. Numeral 70 indicates the holder in which the article is placed; the holder being formed with a lip 71. The shaping head is indicated by numeral 72, and this head has on its under side a boss 73; the boss having a lip shaped portion 74 to cooperate with the lip 71. The shaper head is carried by a rod 20' which may be reciprocated by hand, or this shaper head may be mounted on the rod 20 in the automatic machine illustrated in Figures 1 and 2, in which event the belt 29 would be removed to prevent rotation of the rod 20. An elevator mechanism, indicated generally by numeral 75, may be employed to lift the shaped ware from the holder. This elevator may be operated by hand or by automatic machinery. The article to be shaped is placed in the holder 70, and the shaping head is lowered, either by hand or mechanically, to bring it into contact with the article, whereupon the lipped portion 74 of the boss 73 will force a portion of the article into the shape of the lip 71, while the boss 73 will retain the remaining portion of the article in its original shape. As stated before this device may be operated by hand or automatically. If the device is to be operated automatically, it is only necessary to substitute the holder 70 for the holder 37, and substitute the shaping head 72 for the shaping head 23, and throw off the belt 29 to prevent rotation of the head.

It is believed the invention will be clearly understood from the foregoing description, and as the operation of the machine has been described in connection with the description of the various features of the invention, it is deemed unnecessary to further describe the operation.

In accordance with the patent statutes we have described what we now believe to be the best embodiment of the invention, but we do not wish to be understood thereby as limiting ourselves or the scope of the invention, as many changes and modifications may be made without departing from the spirit of the invention; all such we aim to include in the scope of the appended claims.

What we claim as new and desire to secure by Letters Patent is:

1. An apparatus of the character described, including a holder for the article, a reciprocable member, a shaping head carried by said member, a plurality of pins each having one end mounted in the head, a ring in which the opposite ends of said pins are mounted, shaping rollers mounted on the pins, and means for rotating the shaping head.

2. An apparatus of the character described, including a holder for the article, a reciprocable member, a shaping head carried by said member, a plurality of pins each having one end mounted in the head, a ring in which the opposite ends of said pins are mounted, shaping rollers mounted on said pins, said rollers being flared, and means for rotating the shaping head.

3. An apparatus for shaping preformed glass articles, including a rotatable shaping head, a circular series of shaping rollers carried by said head, said rollers mounted on substantially vertical axles and adapted to project a substantial distance below the mouth of the articles and another circular series of rollers carried by said head and arranged within the first mentioned series.

4. An apparatus of the character described, including two holders, one of said holders adapted to hold a preformed article with its open end up, a shaper for forming the open end of the article, the other of said holders adapted to receive a preformed article with its open end down, and means adapted to press on the upper end of the article to shape the lower end thereof.

5. An apparatus of the character described, including two holders, one of the holders adapted to receive a preformed article with its open end up, and the other of the holders adapted to receive a preformed article with the open end down, a reciprocable member, and two implements carried by said member and adapted to simultaneously act upon said articles.

6. The method of shaping articles, which consists in placing a preformed article in a holder with its open end up, shaping the open end of the article, inverting the article, and exerting pressure on the upper end thereof to shape the lower end.

7. An apparatus of the character described, including a support, two holders mounted on said support, a vertically reciprocable crosshead, two shaping implements carried by the crosshead, and a connecting rod resiliently connected with the crosshead.

8. An apparatus of the character described, including two holders for articles, a reciprocable crosshead, two shaping implements carried by the crosshead, and means for rotating one of said implements.

9. An apparatus of the character described, including a reciprocable crosshead, two rods carried by the crosshead, one of said rods being rotatable, a plurality of rollers carried by the rotatable rod, and a plunger cap mounted on the other of said rods.

10. An apparatus of the character described, including a holder for a preformed article, a reciprocable member for shaping the article, and means mechanically operated and periodically applying a vacuum to said holder, said means operating in timed relation with the reciprocable shaping members.

11. An apparatus of the character described, including a holder for the article, a reciprocable shaping member, means operated by the downward movement of said shaping member for applying a vacuum to the holder, and means operated by the upward movement of said shaping member for breaking the vacuum.

12. An apparatus of the character described, including a holder for the article, a movable shaping member, and means mechanically operated and controlling the application of a vacuum to the holder, said means being operated by movement of the shaping member in one direction to apply vacuum, and being operated by movement of the shaping member in the reverse direction to break the vacuum.

13. An apparatus of the character described, including a holder for the article, a reciprocable crosshead, a shaping member carried by the crosshead, valve mechanism for controlling the application of a vacuum to said holder, and means carried by the crosshead for operating said valve mechanism.

14. An apparatus of the character described, including a holder for the article, a reciprocable crosshead, a shaping member carried by the crosshead, valve mechanism for controlling the application of a vacuum to said holder, and a shoe carried by the crosshead and adapted to control said valve mechanism.

15. An apparatus of the character described, including a holder for the article, a reciprocable crosshead, a shaping member carried by the crosshead, a pipe connected to the holder and leading to a vacuum source, a valve cylinder communicating with said pipe, valve mechanism within said cylinder for causing said pipe to alternately communicate with the vacuum source and with the atmosphere, and means carried by the crosshead for operating the valve mechanism.

16. An apparatus of the character described, including a holder for the article, a reciprocable crosshead, a shaping member carried by the crosshead, a pipe connected to the holder and leading to a vacuum source, a valve cylinder communicating with said pipe, a valve stem mounted in said valve cylinder, means carried by the valve stem for causing said pipe to alternately communicate with the vacuum source and with the atmosphere, and a shoe carried by the crosshead and adapted to operate the valve stem.

HALLER H. DAWSON.
IRA H. FREESE.